(12) United States Patent
Mayhew et al.

(10) Patent No.: US 7,847,505 B2
(45) Date of Patent: Dec. 7, 2010

(54) SYSTEM AND METHOD FOR CONFIGURING A SOFT STARTER

(75) Inventors: Scott Mayhew, North Aurora, IL (US); Scott Wakefield, Plano, IL (US); Daniel Zuzuly, Geneva, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 1761 days.

(21) Appl. No.: 10/786,320

(22) Filed: Feb. 25, 2004

(65) Prior Publication Data

US 2005/0200326 A1 Sep. 15, 2005

(51) Int. Cl.
*G05B 19/18* (2006.01)
*G05B 19/00* (2006.01)

(52) U.S. Cl. .................. 318/569; 318/568.23; 318/570; 318/632

(58) Field of Classification Search ............ 318/568.23, 318/632, 569, 570
See application file for complete search history.

(56) References Cited

U.S. PATENT DOCUMENTS 5,206,572 A * 4/1993 Farag et al. ................. 318/778
5,656,906 A * 8/1997 Iwashita et al. ........ 318/568.23
5,732,212 A * 3/1998 Perholtz et al. ............. 709/224
6,144,183 A * 11/2000 Kawai ........................ 318/675

* cited by examiner

*Primary Examiner*—Paul Ip
(74) *Attorney, Agent, or Firm*—Filip A. Kowalewski

(57) ABSTRACT

An externally configurable soft starter system comprises a motor controller including solid state switches for controlling application of power to a motor. A control circuit controls operation of the solid state switches. The control circuit comprises a programmed processor for commanding operation of the solid state switches and a memory connected to the programmed processor storing parameters relating to operation of the solid state switches. An interface circuit is operatively connected to the programmed processor. An external device includes a memory for storing parameters relating to operation of the solid state switches and an interface for communication with the motor controller. A configuration program is operatively implemented in the programmed processor and the external configuration device for transferring a configuration database file between the controller memory and the external device memory. The configuration database file comprises a plurality of the stored parameters relating to operation of the solid state switches.

14 Claims, 5 Drawing Sheets

SYSTEM AND METHOD FOR CONFIGURING A SOFT STARTER

CROSS REFERENCE TO RELATED PATENT APPLICATIONS

The present U.S. patent application having at least one common inventor as
- U.S. patent application Ser. No. 10/786,318 entitled "System and Method for Fault Contactor Detection", (2004P02544US), and
- U.S. patent application Ser. No. 10/786,319 entitled "System and Method for Providing Electrical System Monitoring and Diagnosis", (2004P02541US), and being filed with the U.S. Patent and Trademark Office concurrently on Feb. 25, 2004, the entirety of each is incorporated herein by reference.

FIELD OF THE INVENTION

This invention relates to a motor controller, such as a soft starter, and, more particularly, to a system and method for configuring a motor controller.

BACKGROUND OF THE INVENTION

Solid state starters/controllers have found widespread use for controlling application of power to an AC induction motor. The conventional starter/controller, referred to hereinafter as simply a controller, uses solid state switches for controlling application of AC line voltage to the motor. The switches may be thyristors such as silicon controlled rectifiers (SCRS) or triacs.

Conventional controllers include a housing enclosing the solid state switches and a control circuit for controlling operation of the solid state switches. For configuring controller operation the motor controller may include push button switches for setting parameter functions and ranges. Indicator lights, such as LEDs, may be used for status indication. While such a user interface may be adequate for configuring the motor controller, the user interface may not be considered user friendly to some end users. Particularly, entering setup parameters into the controller's memory may be time consuming and error prone because the data is entered by a series of keystrokes.

The present invention is directed to improvements in configuring motor controllers.

SUMMARY OF THE INVENTION

In accordance with the invention, there is provided a system and method for configuring a motor controller.

Broadly, there is disclosed herein in accordance with one aspect of the invention a method of configuring a motor controller with an external device comprising providing the motor controller to include solid state switches for controlling application of power to the motor, and a control circuit for controlling operation of the solid state switches, the control circuit comprising a programmed processor for commanding operation of the solid state switches, and a memory connected to the programmed processor for storing parameters relating to operation of the solid state switches; providing the external device to include a memory for storing parameters relating to operation of the solid state switches; establishing communications between the programmed processor and the external device; and transferring a configuration database file between the controller memory and the external device memory, the configuration database file comprising a plurality of the stored parameters relating to operation of the solid state switches.

It is a feature of the invention that parameters are entered relating to operation of the solid state switches into the external device memory to define the configuration database file to be transferred to the controller memory.

It is another feature of the invention that transferring a configuration database file comprises downloading the configuration database file from the external device memory to the controller memory.

It is still another feature of the invention that transferring a configuration database file comprises uploading the configuration database file from the controller memory to the external device memory. The uploaded configuration database file may subsequently be downloaded from the external device memory to the controller memory. A listing of the uploaded configuration database file may be printed.

It is still a further feature of the invention to store a plurality of pre-configured database files in the external device memory. Transferring a configuration database file may comprise downloading a select one of the pre-configured database files from the external device memory to the controller memory.

It is still another feature of the invention that establishing communications between the programmed processor and the external device comprises providing an infrared communication path between the programmed processor and the external device.

It is yet another feature of the invention that establishing communications between the programmed processor and the external device comprises providing a wired communication path between the programmed processor and the external device.

There is disclosed in accordance with another aspect of the invention an externally configurable motor controller system comprising a motor controller including solid state switches for controlling application of power to a motor. A control circuit controls operation of the solid state switches. The control circuit comprises a programmed processor for commanding operation of the solid state switches and a memory connected to the programmed processor storing parameters relating to operation of the solid state switches. An interface circuit is operatively connected to the programmed processor. An external configuration device includes a memory for storing parameters relating to operation of the solid state switches and an interface for communication with the motor controller. Means are operatively associated with the programmed processor and the external configuration device for transferring a configuration database file between the controller memory and the external device memory. The configuration database file comprises a plurality of the stored parameters relating to operation of the solid state switches.

There is disclosed in accordance with yet another aspect of the invention an externally configurable soft starter system comprising a motor controller including solid state switches for controlling application of power to a motor. A control circuit controls operation of the solid state switches. The control circuit comprises a programmed processor for commanding operation of the solid state switches and a memory connected to the programmed processor storing parameters relating to operation of the solid state switches. An interface circuit is operatively connected to the programmed processor. An external device includes a memory for storing parameters relating to operation of the solid state switches and an interface for communication with the motor controller. A configuration program is operatively implemented in the programmed processor and the external configuration device for transferring a configuration database file between the controller memory and the external device memory. The configuration database file comprises a plurality of the stored parameters relating to operation of the solid state switches.

Further features and advantages of the invention will be readily apparent from the specification and from the drawings.

DETAILED DESCRIPTION OF THE INVENTION

Figure 1:
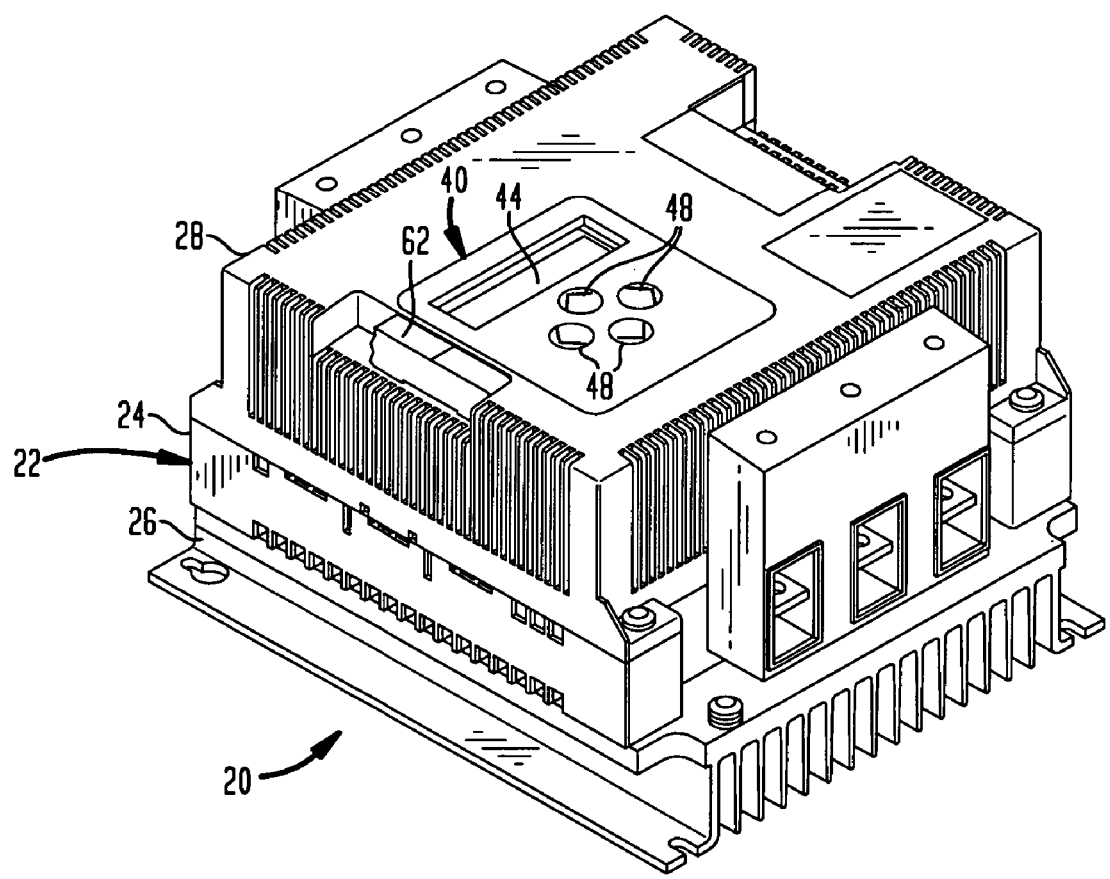
FIG. 1 is a perspective view of a configurable motor controller in accordance with the invention.

Referring initially to FIG. 1, a configurable solid state motor starter/controller 20, referred to hereinafter as simply a controller, in accordance with the invention is illustrated.

One application for the controller 20 is as an elevator starter. The motor controller 20 may be used to drive a pump for an hydraulic-elevator. Each time movement of an elevator car is commanded, then the motor controller 20 must start the elevator motor until it reaches operating speed and then operate in a run mode. Such a motor controller 20 may only be used for the up direction as gravity may be used for the down direction. One type of elevator starter, referred to as a soft starter, changes the on time of the solid state switches to control voltage and to ramp up motor current with a fixed connection.

The motor controller 20 may be as generally described in pending application Ser. No. 10/252,326, assigned to the assignee of the present application, the specification of which is incorporated by reference herein. The motor controller 20 comprises a housing 22 including a housing base 24, a heat sink 26 and a cover 28. The motor controller 20 includes a plurality of solid state switches 32 in the form of thyristors, such as back to back connected silicon controlled rectifier (SCR) pairs, see FIG. 2. For simplicity herein, the SCR pairs 32 are referred to as simply SCRs. Triacs could also be used. The SCRs 32 control application of three phase AC line power to a three phase motor. A different number of SCRs 32 could be used to control different numbers of phases, as is apparent to those skilled in the art.

Figure 2:
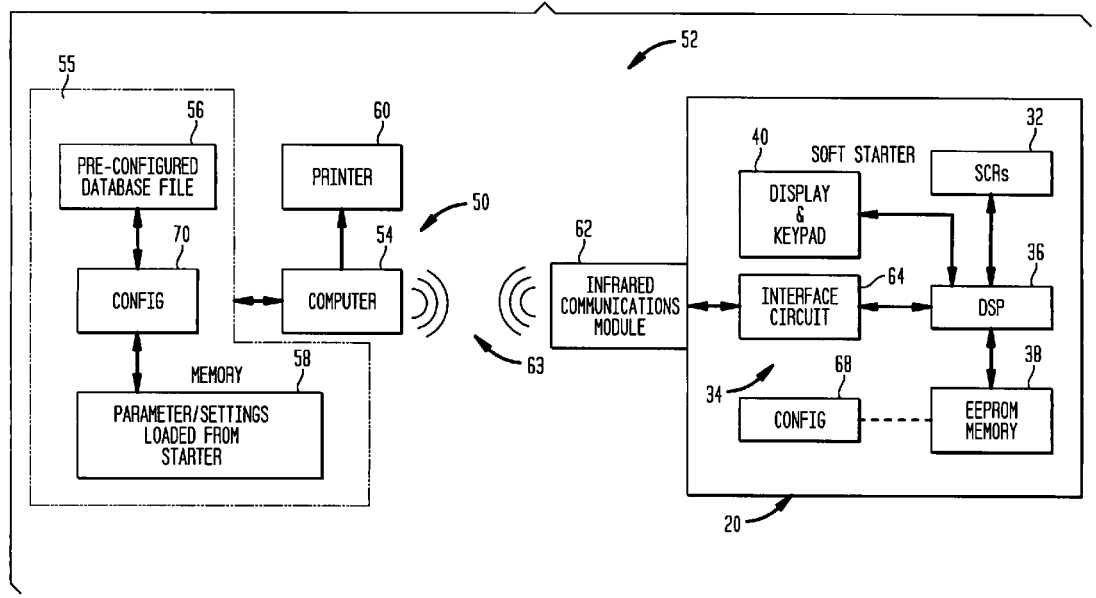
FIG. 2 is a block diagram of a wireless embodiment of a configurable motor control system in accordance with the invention.

The SCRs 32 are mounted to the heat sink 26 within the housing 20. Referring also to FIG. 2, a control circuit 34 is also enclosed in the housing 20. The control circuit 34 controls operation of the SCRs 32. Particularly, the control circuit 34 includes a programmed processor 36, such as a digital signal processor, for commanding operation of the SCRs 32. A memory 38, such as an Eprom memory, is connected to the processor 36 and stores parameters relating to operation of the solid state switches 32, as described below.

A display and keypad user interface 40, comprising an LCD display 44 and actuator elements, such as push buttons 48, on the cover 28, see FIG. 1, is connected to the processor 36. The display 44 is used to indicate configuration settings, operating values, fault conditions, and the like. User actuable switches (not shown) are electrically connected to the processor 36 and are actuated by the actuator elements 48. Particularly, the actuator elements 48 are used for manually selecting parameters for stored configuration information.

In accordance with the invention, the motor controller 20 is adapted for configuration with an external configuration device 50 to define a configurable motor controller system 52. The external configuration device 50 comprises a computer 54. The computer 54 could be a conventional desktop computer, a laptop computer, or a personal digital assistant (PDA), or the like. In the illustrated embodiment of the invention, represented in FIG. 2, the computer 54 is adapted for wireless communication using infrared signaling or the like. For example, an infrared communication module is a standard element on commercially available PDAs. Similarly, wireless communication could be provided using currently available technologies such as Wi-Fi or Bluetooth.

The computer 54 is connected to a memory 55. The memory 55 could be internal memory of the computer 54 or removable media, as necessary or desired. The memory 55 stores pre-configured database files 56 and parameter and settings database files 58 uploaded from the motor controller 20. A printer 60 may be connected to the computer 54 to print configuration information.

In accordance with the invention, an infrared module 62 is mounted to the motor controller cover 22 and is electrically connected to the processor 36 via a conventional interface circuit 64. The IR module 62 allows communications with the computer 54 via a wireless communication path 63. The infrared module 62 provides necessary voltage isolation with the computer 54.

Figure 3:
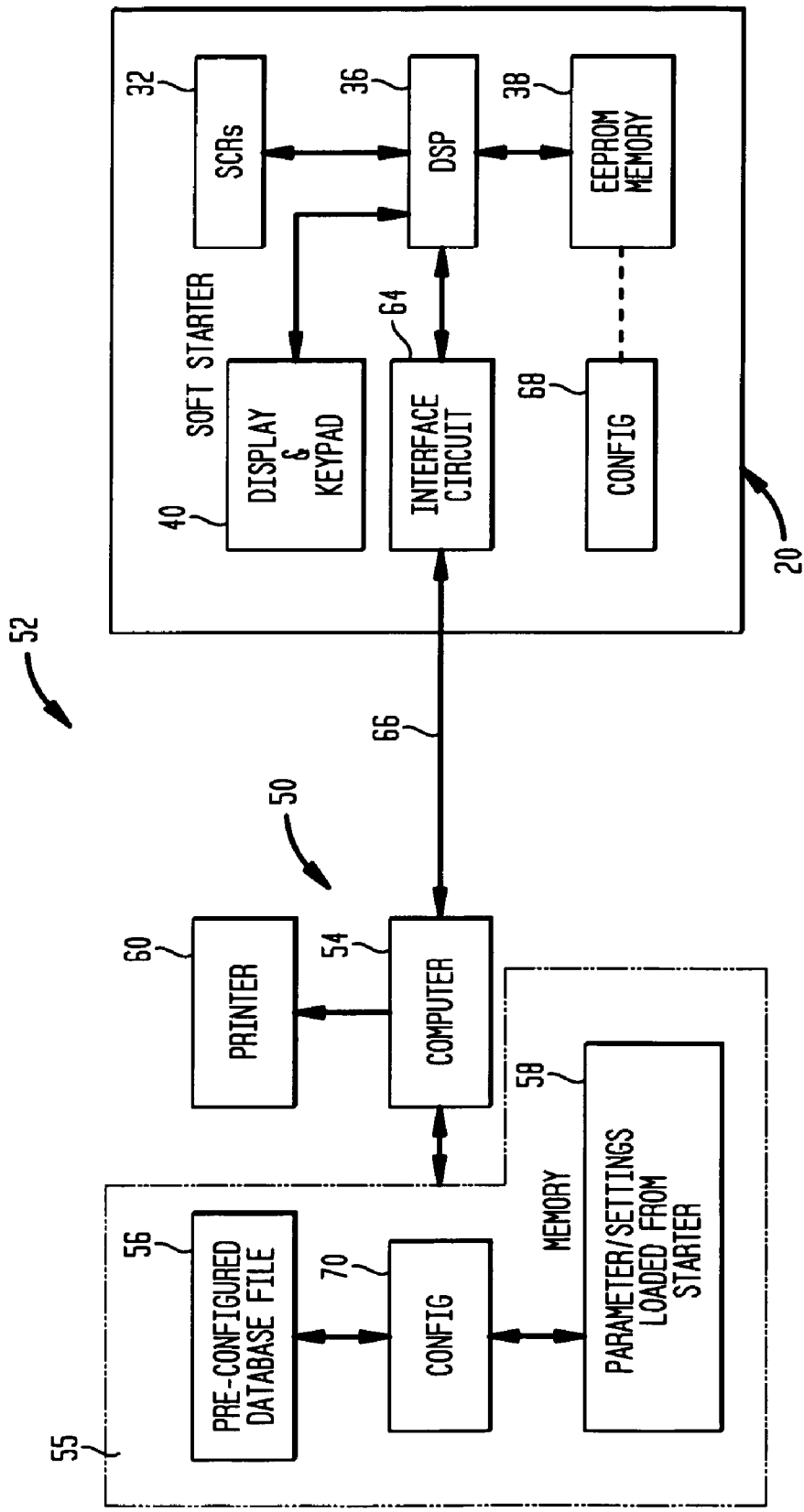
FIG. 3 is a block diagram of a wired embodiment of a configurable motor control system in accordance with the invention.

Alternatively, and with reference to FIG. 3, the external device 50 could be hard wired using an electrically isolated serial cable 66 from the computer 54 to the interface circuit 64 for configuration. It should also be appreciated that the motor controller 20 could be configured or monitored from an external device over a network, such as the internet. As such, the cable 66 can represent the network or the external device 50 could be connected to the network in a conventional manner.

As discussed above, the motor controller 20 includes a local user interface in the form of the display and keypad 40 on the housing 22 for locally updating stored configuration information in the memory 38. Alternatively, external configuration is provided in the form of the external configuration device 50 for selectively uploading or downloading stored configuration information. The memory 38 includes a configuration module 68 implemented by the programmed processor 36. The configuration module 68 operates in conjunction with the external configuration device 50 to transfer configuration database files therebetween, as described below. The configuration database files define parameters and settings relating to operation of the SCRs 32 during normal operation.

The computer 54 operates in accordance with various programs stored in the memory 55 and including a configuration program module 70. As with the controller configuration module 68, the configuration device configuration module 70 comprises a routine for transferring configuration information to or from the motor controller 20. Particularly, the configuration module 70 allows a user to enter pre-set parameters and settings for each unique system type available. The data would be entered one time and stored in the pre-configured database file 56 for each type of controller 20. For example, a different configuration can be entered and stored for difference motor sizes, elevator configurations, and the like. Entering or choosing the desired system type from within the software then automatically downloads the parameters and settings to the motor controller 20. This software could also be useful by a field service technician. One example, would be when a motor controller 20 has to be replaced. The configuration module 70 would first retrieve the configuration parameters and settings from the old motor controller for storage in the database file 58. The software could also be capable of printing a summary of the configuration information on the printer 60 for review by the field service technician. This would then give the technician a quick overview without having to press numerous key strokes and without having to write down all of the information. Once the old motor controller is removed and the new replacement motor controller is installed, then the parameters and settings of the old starter could be retrieved from the stored database file 58 and downloaded into the new motor controller. This eliminates manual entry of data by the field service technician.

Figure 4:
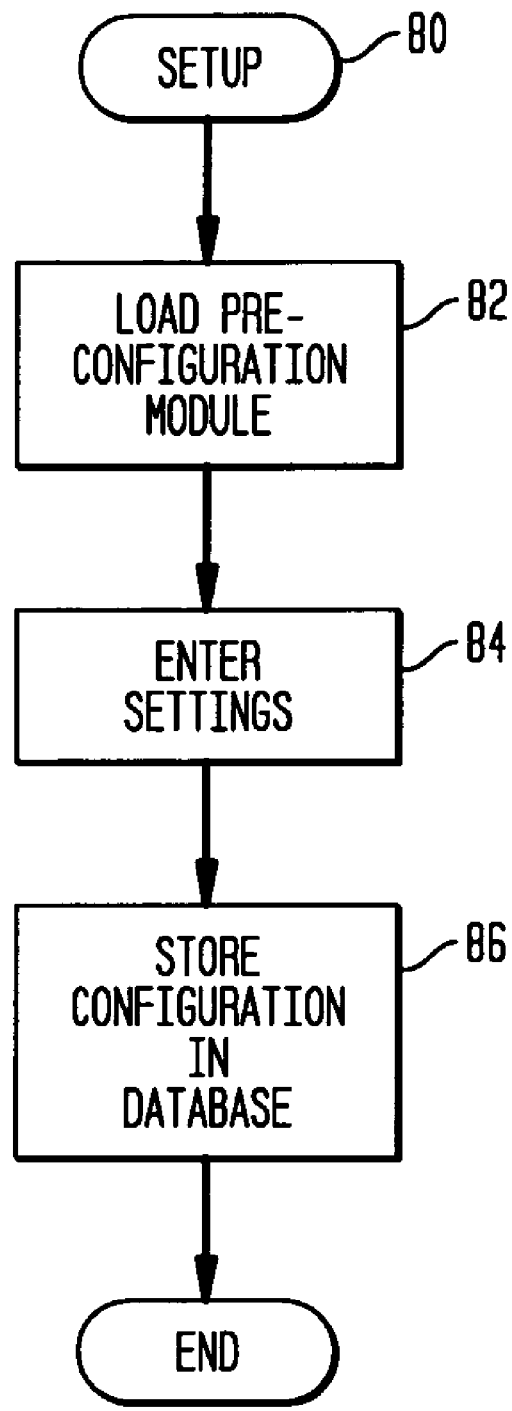
FIG. 4 is a flow diagram illustrating a configuration setup module implemented by the control system of FIGS. 2 and 3.

Referring initially to FIG. 4, a flow diagram illustrates the portion of the configuration module 70 for creating the pre-configured database files 56. The program begins by entering the routine at a set up node 80. The pre-configuration module is loaded at a block 82 which provides a table of parameters and settings that can be downloaded. The following table is an exemplary listing of possible parameters and settings that can be downloaded:

TABLE

| Starter Sub-Menu Category | Parameter/Setting |
| --- | --- |
| Parameter Menu | Starting Amps |
|  | Overload Amps |
|  | Line Rotation |
|  | Off Delay mS. |
|  | On Delay mS. |
| OEM Menu | Starting Mode |
|  | Overload Mode |
|  | Amp Imbalance |
|  | Imbalance Enable |
|  | Low Amp UTS |
|  | Cycle Fault Contactor |
|  | Stall Detect |
|  | Stall Time |
|  | Start Limit Time |
| Engineering Menu | Prop Factor |
|  | Int Factor |
|  | Configuration |
|  | Motor Detection |
|  | Test Code |

The particular parameters or settings are entered on the computer 54 at a block 84 and are then stored in the database file 56 for a particular starter configuration at a block 86 and the routine ends. This process can be repeated for developing multiple pre-configured database files.

As discussed above, the motor controller configuration module 68 stores a select database file comprising parameters and settings, such as those in the table above, for use by the processor 36. Otherwise, the configuration module 68 is adapted for transferring a database file to or from the external configuration device 50. Once communication is established on the wireless communication path 63, see FIG. 2, or the wired communication path 66, see FIG. 3, the configuration module 68 operates under control of the external device configuration module 70 for selectively transferring or receiving a particular database file, as described below.

Figure 5:
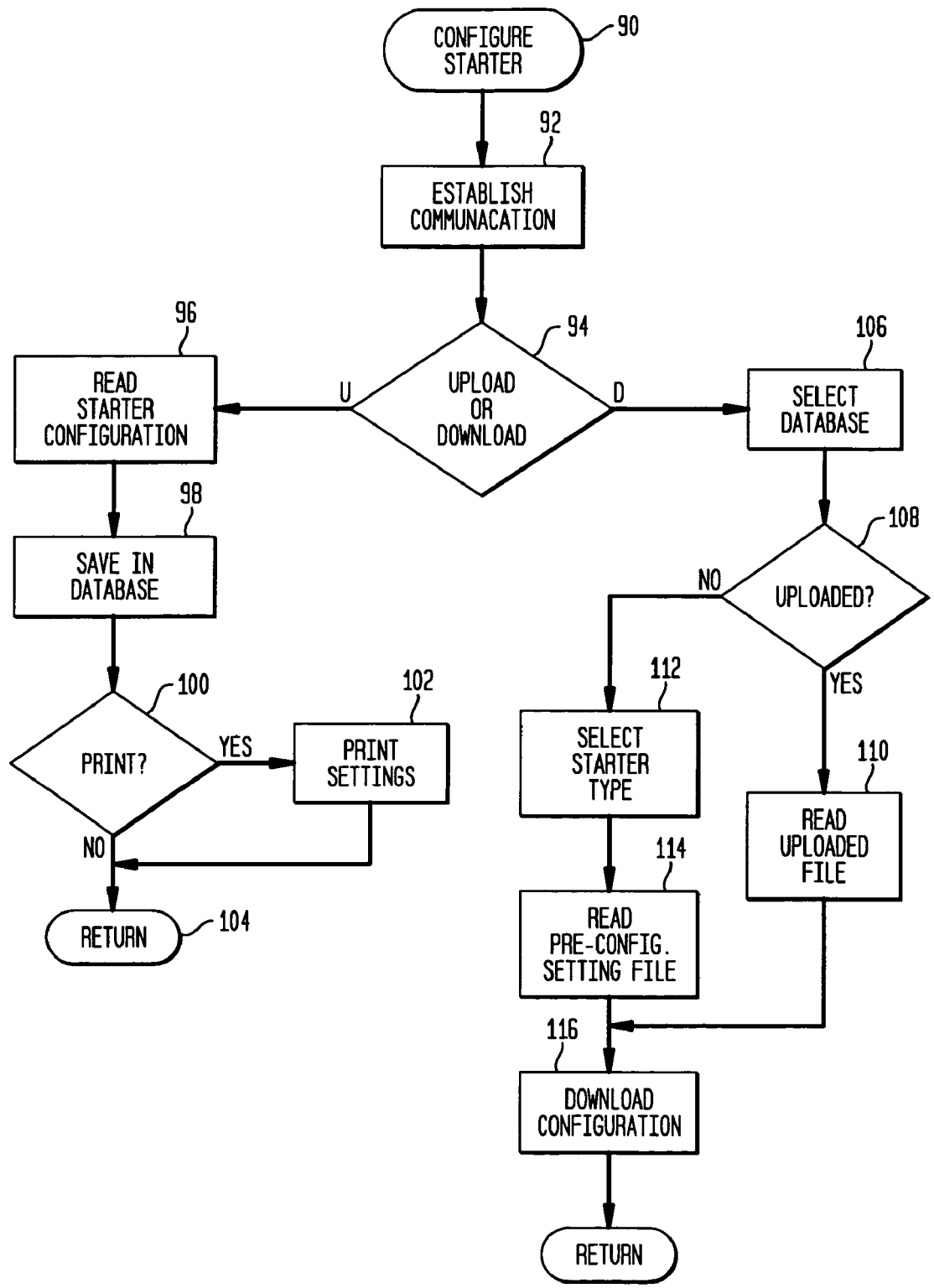
FIG. 5 is a flow diagram illustrating a configure starter routine implemented by the control system of FIGS. 2 and 3.

With reference to FIG. 5, the configure starter program operated by the configuration module 70 is illustrated beginning at a node 90. A block 92 establishes communications with the motor controller 20 via one of the conventional paths 63 or 66. A decision block 94 determines whether an upload or download operation is selected. An upload operation is used to retrieve the database file from the controller 20, such as for servicing, as described above. The download operation is used to download a new database configuration to the motor controller 20.

If upload is selected, then a block 96 reads the starter database configuration from the motor controller memory 38. This is then saved in the parameter and settings database file 58 at a block 98. A decision block 100 determines whether or not the uploaded parameters and settings should be printed. If so, then they are printed at a block 102. Thereafter, or if printing is not selected, then the module returns to normal operation at a block 104.

If download at the block 94 is selected, then a database file to be downloaded is selected at a block 106. The database file can be the file that was previously uploaded and stored in the parameter and settings database file 58, or can be one of the pre-configured database files 56. A decision block 108 determines if the selected database is a previously uploaded database file and if so, reads the uploaded file from the parameter and settings file 58 at a block 110. If not, then the starter type is selected at a block 112 and the pre-configured database file for the particular selected starter type is read at a block 114. Whichever file is read at the block 110 or the block 114 is then downloaded to the motor controller memory 38 at a block 116 and the program then returns to normal operation.

It can therefore be appreciated that a new and novel system and method for configuring a motor controller, such as a soft starter, with an external device has been described. It will be appreciated by those skilled in the art that, given the teaching herein, numerous alternatives and equivalents will be seen to exist which incorporate the disclosed invention. As a result, the invention is not to be limited by the foregoing exemplary embodiments, but only by the following claims.

We claim:

1. A method of configuring a motor controller with an external configuration device, comprising:

providing the motor controller to include solid state switches for controlling application of power to the motor, and a control circuit for controlling operation of the solid state switches, the control circuit comprising a programmed processor for commanding operation of the solid state switches, and a controller memory connected to the programmed processor for storing configuration information relating to operation of the solid state switches;

providing the external configuration device to include a memory for storing parameters relating to operation of the solid state switches;

establishing communications between the programmed processor and the external configuration device;

uploading a configuration database file from the controller memory to the external configuration device memory, the configuration database file comprising a plurality of the stored parameters relating to operation of the solid state switches; and subsequently downloading the uploaded configuration database file from the external configuration device memory to the controller memory.

2. The method of configuring a motor controller with an external configuration device of claim 1 further comprising entering parameters relating to operation of the solid state switches into the external device memory to define a second configuration database file.

3. The method of configuring a motor controller with an external configuration device of claim 1 further comprising printing a listing of the uploaded configuration database file.

4. The method of configuring a motor controller with an external configuration device of claim 1 further comprising storing a plurality of pre-configured database files in the external device memory.

5. The method of configuring a motor controller with an external configuration device of claim 1 wherein establishing communications between the programmed processor and the external configuration device comprises providing an infrared communication path between the programmed processor and the external configuration device.

6. The method of configuring a motor controller with an external configuration device of claim 1 wherein establishing communications between the programmed processor and the external configuration device comprises providing a wired communication path between the programmed processor and the external configuration device.

7. The method of configuring a motor controller with an external configuration device of claim 1, further comprising:
uploading the configuration database file to the external configuration device memory prior to servicing the motor controller; and
downloading the uploaded configuration database file to the controller memory after servicing the motor controller.

8. An externally configurable motor controller system, comprising:
a motor controller including solid state switches for controlling application of power to a motor, and a control circuit for controlling operation of the solid state switches, the control circuit comprising a programmed processor for commanding operation of the solid state switches, and a controller memory connected to the programmed processor storing configuration information relating to operation of the solid state switches, and an interface circuit operatively connected to the programmed processor;
an external configuration device including a memory for storing parameters relating to operation of the solid state switches and an interface for communication with the motor controller; and
means operatively associated with the programmed processor and the external configuration device for uploading a configuration database file from the controller memory to the external configuration device memory, and for subsequently downloading the uploaded configuration database file from the external configuration device memory to the controller memory, the configuration database file comprising a plurality of the stored parameters relating to operation of the solid state switches.

9. The externally configurable motor controller system of claim 8 further comprising a printer operatively associated with the external configuration device for printing a listing of the uploaded configuration database file.

10. The externally configurable motor controller system of claim 8 wherein the external configuration device memory stores a plurality of pre-configured database files.

11. The externally configurable motor controller system of claim 8 further comprising an infrared communication path between the programmed processor and the external configuration device.

12. The externally configurable motor controller system of claim 8 further comprising a wired communication path between the programmed processor and the external configuration device.

13. An externally configurable soft starter system, comprising:
a motor controller including solid state switches for controlling application of power to a motor, and a control circuit for controlling operation of the solid state switches, the control circuit comprising a programmed processor for commanding operation of the solid state switches, and a controller memory connected to the programmed processor storing configuration information relating to operation of the solid state switches, and an interface circuit operatively connected to the programmed processor;
an external configuration device including a memory for storing parameters relating to operation of the solid state switches and an interface for communication with the motor controller; and
a configuration program operatively implemented in the programmed processor and the external configuration device for uploading a configuration database file from the controller memory to the external configuration device memory, and for subsequently downloading the uploaded configuration database file from the external configuration device memory to the controller memory, the configuration database file comprising a plurality of the stored parameters relating to operation of the solid state switches.

14. The externally configurable soft starter system of claim 13 wherein the external configuration device memory stores a plurality of pre-configured database files.

* * * * *